3,344,142
DICHLORINATION OF 3-AMINOPYRAZINOIC ACID ESTERS

Burwell F. Powell, Somerville, and Edward W. Tristram, Cranford, N.J., assignors to Merck & Co., Inc., Rahway, N.J., a corporation of New Jersey
No Drawing. Filed Nov. 3, 1965, Ser. No. 506,268
4 Claims. (Cl. 260—250)

This invention is concerned with a novel process for preparing 3-amino-5,6-dichloropyrazinoic acid esters.

Under conditions generally employed for chlorinating aromatic compounds as described in the prior literature, it was found that treatment of 3-aminopyrazinoic acid esters with chlorine gives a dichloro derivative in which one chlorine is at the six position of the ring and the other chlorine is on a nitrogen atom, presumably the 3-amino nitrogen atom. Mild reducing agents, such as bisulfite can reduce the 6-chloro-N-chloro derivative to the mono-chlorinated product, 3-amino-6-chloro-2-pyrazinoic acid ester. The conditions outlined in the prior literature for chlorinating aromatic compounds would not, however, attach a chloro atom to the 5-position of a 3-aminopyrazinoic acid ester.

It has now surprisingly been found that 5,6-dichlorination with chlorine of 3-aminopyrazinoic acid esters can be effected in one step provided chlorine is admitted to a mixture of an ester of 3-aminopyrazinoic acid and a polar non-protic solvent. 5,6-dichlorination can be effected under these conditions either at room temperature or with slight warming up to reflux conditions providing very good yields of the 5,6-dichloro products.

Polar non-protic solvents that have been found to be particularly useful media in which the reaction is to be carried out are acetonitrile, dimethylformamide, dimethylacetamide, dioxane, tetrahydrofuran and other well-known polar non-protic solvents. Less polar non-protic solvents such as carbon tetrachloride, ethylene dichloride, hexane and other non-protic solvents advantageously can be improved as solvents for the chlorination if a small amount of dimethylformamide, acetonitrile or other polar non-protic solvent is added to enhance the polar properties of the solvent mixture.

The particular ester of 3-aminopyrazinoic acid employed is not critical; any alkyl, aryl or aralkyl ester can be used as starting material. While the methyl ester has been selected to illustrate the novel process of this invention, other alkyl esters as ethyl, propyl, butyl or higher alkyl esters or phenyl or phenalkyl esters can be substituted therefor with equivalent results being obtained.

The 3-amino-5,6-dichloropyrazinoic acid ester prepared by the process of this invention is useful as a diuretic agent. In addition, it is useful as an intermediate which when diazotized and coupled yields dyestuffs or it can be used as an intermediate for preparing (3-amino-5,6-dichloropyrazinoyl)guanidine products that possess diuretic properties. These latter products are prepared by the reaction of the 3-amino-5,6-dichloropyrazinoic acid ester with guanidine. The ester may also be reacted with ammonia or an amine to form the 3-amino-5-NRR[1]-6-chloropyrazinoate which when reacted with guanidine forms (3 - amino-5-NRR[1]-6-chloropyrazinoyl)guanidine wherein R and R[1] preferably represent hydrogen or lower alkyl.

The invention will be described in more detail in the following examples which will serve to illustrate various modifications which fall within the purview of this invention.

EXAMPLE 1
*Chlorination in the presence of acetonitrile*

Methyl 3-aminopyrazinoate (5.0 g., 32.7 mole) is slurried with 50 ml. of acetonitrile. The temperature is held at 45–55° C. and chlorine is introduced into the stirred suspension for 30 minutes at a rate of 4.0 moles/min. The mixture then is concentrated under reduced pressure to a small volume and 120 ml. of xylene added. The mixture is distilled until the head temperature reaches 133° C. and the xylene solution of methyl 3-amino-5,6-dichloropyrazinoate is treated with decolorizing carbon and allowed to crystallize to give 6.6 g. (91%) of methyl 3-amino-5,6-dichloropyrazinoate, M.P. 233–234° C.

EXAMPLE 2
*Chlorination in the presence of acetonitrile*

Methyl 3-aminopyrazinoate (5.0 g., 32.7 mmoles) is slurried with 50 ml. of acetonitrile. After flushing with nitrogen, chlorine is bubbled into the slurry for 36 minutes at a rate of 3 mmoles/min. (108 mmoles $Cl_2$). The red slurry is stirred at room temperature for 0.5 hour, then 150 ml. of water is added and the slurry stirred for an additional 0.75 hour. The product is filtered off, washed twice with water and dried in vacuum at 50° C. yielding 6.57 g. (90.5% of theory) of methyl 3-amino-5,6-dichloropyrazinoate, M.P. 221–225° C. Following purification of the product by adding it to xylene and then removing the xylene by distillation, the product melts at 233–234° C.

EXAMPLE 3
*Chlorination in the presence of ethylene dichloride*

Methyl 3-aminopyrazinoate (5.0 g., 32.7 mmoles) is slurried with 50 ml. of ethylene dichloride. The flask is flushed with nitrogen, then chlorine is bubbled through the slurry for 32.7 min. at 3 mmoles/min. (98.1 mmoles). After stirring at room temperature for 2½ hours the methyl 3-amino-5,6-dichloropyrazinoate is filtered off, washed with water and purified as described in Example 1.

EXAMPLE 4
*Chlorination in the presence of carbon tetrachloride and dimethylformamide*

Methyl 3-aminopyrazinoate (4.0 g., 26.1 mmoles) is stirred with 60 ml. of carbon tetrachloride and 2 ml. of dimethylformamide. Chlorine is bubbled into the mixture for 14 minutes at a rate of 5.0 mmoles/min. The temperature increases to 68° C. (reflux) during the chlorination. Thereafter, the mixture is heated at reflux for an additional 5 minutes, then cooled to 14° C. and the product separated by filtration and washed with water to give 4.73 g. (82%) of methyl 3-amino-5,6-dichloropyrazinoate, M.P. 230–234° C.

EXAMPLE 5
*Chlorination in the presence of carbon tetrachloride and acetonitrile*

Methyl 3-aminopyrazinoate (4.0 g., 26.1 mmoles) is stirred with 60 ml. of carbon tetrachloride and 4 ml. of acetonitrile. The temperature is held at 58–68° C. and chlorine is bubbled into the mixture for 14 minutes at a rate of 4.5 mmoles/min. The methyl 3-amino-5,6-dichloropyrazinoate is separated by filtration, washed with water and purified with xylene as described above to give product melting at 230–234° C.

While the invention has been illustrated by the use of certain specific polar non-protic solvents and certain specific temperatures, it is to be understood that the solvents and temperatures may vary within the scope of the above discussion and the appended claims.

What is claimed is:
1. A process wherein chlorine is caused to react with an ester of 3-aminopyrazinoic acid in the presence of a polar non-protic solvent selected from the group consisting of acetonitrile, dimethylformamide, dimethylacetamide, dioxane, tetrahydrofuran, ethylene dichloride, a mixture of carbon tetrachloride and a small amount of dimethylformamide, and a mixture of carbon tetrachloride and a small amount of acetonitrile and at a temperature ranging between room temperature and a reflux temperature to form an ester of 3-amino-5,6-dichloropyrazinoic acid.

2. A process as claimed in claim 1 wherein acetonitrile is employed as the solvent.

3. A process as claimed in claim 1 wherein the reaction medium comprises carbon tetrachloride and a compound selected from dimethylformamide and acetonitrile.

4. A process wherein methyl 3-aminopyrazinoate is caused to react with chlorine in the presence of acetonitrile and at a temperature between room temperature and reflux temperature to give methyl 3-amino-5,6-dichloropyrazinoate.

References Cited
UNITED STATES PATENTS 3,185,686    5/1965    Camerino et al. ____ 260—250

NICHOLAS S. RIZZO, *Primary Examiner.*